United States Patent [19]
Tung et al.

[11] 4,263,410
[45] Apr. 21, 1981

[54] AMBIENT CURE POLYIMIDE FOAM

[75] Inventors: Chiang-Ying M. Tung, Thousand Oaks; Charles L. Hamermesh, Westlake Village, both of Calif.

[73] Assignee: Rockwell International Corporation, El Segundo, Calif.

[21] Appl. No.: 122,084

[22] Filed: Feb. 19, 1980

[51] Int. Cl.³ ............................................. C08G 18/14
[52] U.S. Cl. .................................. 521/106; 521/157; 528/49; 528/51; 528/73
[58] Field of Search ............... 521/106, 114, 119, 120, 521/129, 157; 528/49

[56] References Cited
U.S. PATENT DOCUMENTS

| | | | |
|---|---|---|---|
| 3,772,216 | 11/1973 | Rosser | 521/112 |
| 4,184,021 | 1/1980 | Frosch et al. | 521/114 |

Primary Examiner—Morton Foelak
Attorney, Agent, or Firm—H. Fredrick Hamann; Craig O. Malin

[57] ABSTRACT

A polyimide foam is provided which has improved resistance to crumbling and to high temperatures. The foam is produced by reacting polymethylene polyphenylisocyanate (PAPI) with benzophenone-3,3',4,4'-tetracarboxylic acid dianhydride (BTDA) in the presence of furfuryl alcohol and concentrated phosphoric acid (PA). The ratio of PA to PAPI, (PA/PAPI), must be approximately 20 to 26% by weight.

4 Claims, 2 Drawing Figures

AMBIENT CURE POLYIMIDE FOAM

BACKGROUND OF THE INVENTION

1. Field of the Invention

This invention relates to the field of flame-resistant polyimide foam insulation prepared from aromatic polyisocyanates and aromatic polycarboxylic compounds.

2. Description of the Prior Art

The preparation of polyimide foams from polyisocyanates and aromatic polycarboxylic acid derivatives has generally been accomplished in the presence of various catalyst and with suitable heating. While the foams thus obtained possess excellent fire-retarding properties, their application is restricted to situations where the required heating is practical.

More recently, a process has been developed to produce a flame-resistant, thermally stable polyimide foam without requiring external heating. As described in U.S. Pat. No. 4,184,021, an aromatic polyisocyanate and an aromatic polycarboxylic compound are reacted in the presence of furfuryl alcohol and a strong inorganic acid. The alcohol and the acid produce a vigorous exothermic reaction which provides all the heat necessary for the formation of the polyimide foam.

The present invention is an improvement over the process described in the above mentioned patent. A recognized problem with polyimide foams is the need to reduce their friability while still maintaining their high flame resistant quality. This problem is recognized in U.S. Pat. No. 3,772,216 which discloses the addition of reinforcing fibers such as silicon dioxide fibers 1/32 to ¼ inch long to reduce the polyimide foam's friability.

SUMMARY OF THE INVENTION

It is an object of the invention to provide an improved polyimide foam.

It is an object of the invention to provide a polyimide foam which has high fire retarding properties.

It is an object of the invention to provide a polyimide foam which has low friability.

It is an object of the invention to provide a polyimide foam which has both high fire retarding properties and low friability.

According to the invention, polymethylene polyphenylisocyanate (PAPI) is reacted with benzophenone-3, 3', 4, 4'-tetracarboxylic acid dianhydride (BTDA) in the presence of furfuryl alcohol and concentrated phosphoric acid (PA) to create a polyimide foam. In order for the foam to have excellent fire-retarding properties combined with low friability, the ratio of phosphoric acid to polymethylene polyphenylisocyanate (PA/PAPI) must be approximately 20 to 26% by weight.

DESCRIPTION OF THE PREFERRED EMBODIMENT

Figure 1:
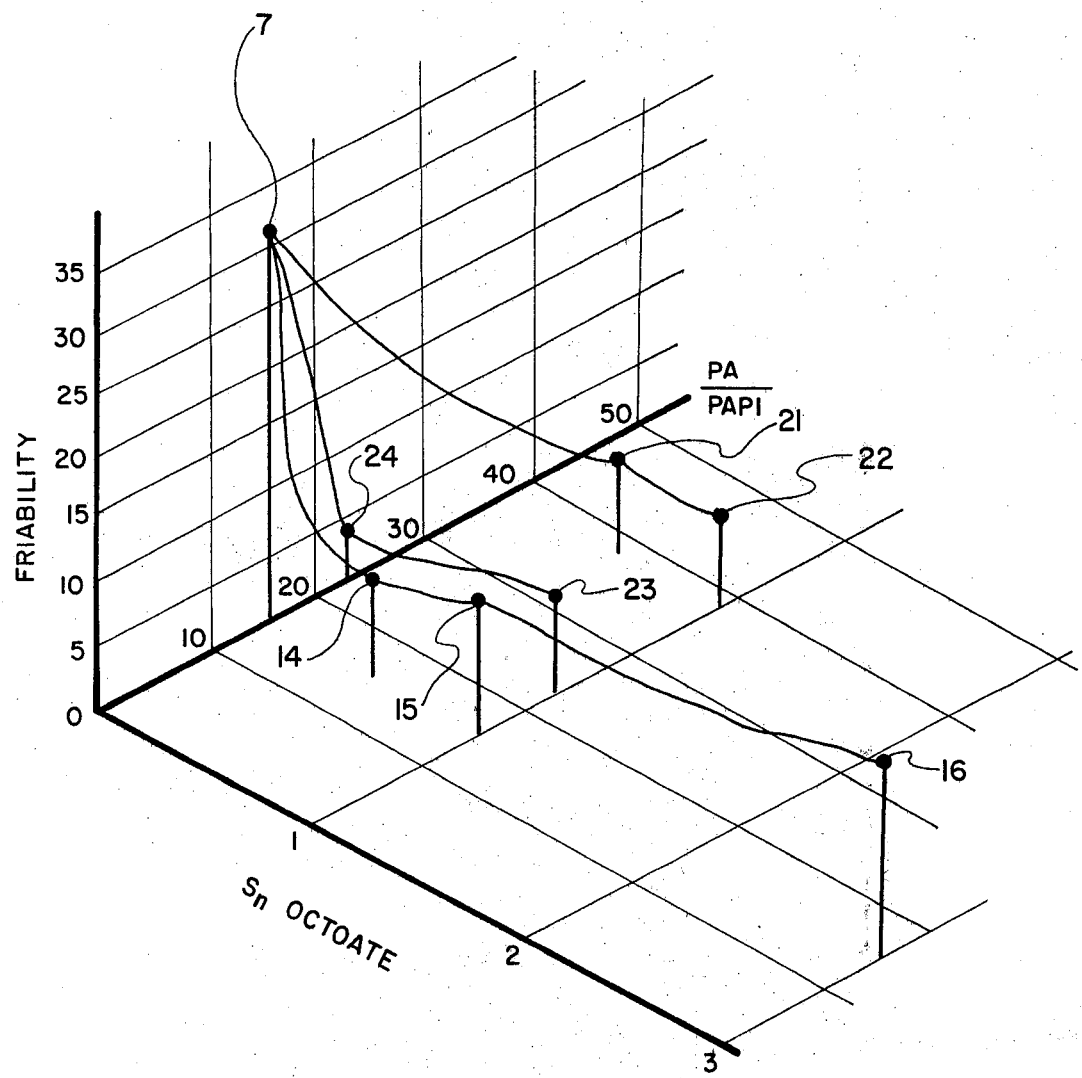
FIG. 1 is a three-dimensional graph showing the effect of the amount of stannous octoate and the effect of the ratio of phosphoric acid to polyphenylisocyanate (PA/PAPI) on the friability of the polyimide foam.

For most applications, it is desirable for polyimide foam to have a low friability and a high resistant to burning. Friability is the tendency of a material to break and crumble. It can be measured using a standard test such as the American Society for Testing Materials test #ASTM-C-421. According to this test, an experimental sample of foam is placed in a tumbler with oak blocks and then tumbled for about 10 minutes. The foam is then removed from the tumbler and its weight loss due to crumbling in the tumbler determined. A low percent weight loss is desirable. This ASTM test was used to determine the friability of foam produced according to this invention.

To determine fire resistance, a Limiting Oxygen Index (LOI) was measured using standard test #ASTM-D-2863. According to this test, samples of foam are heated under atmospheres having various amounts of oxygen. The LOI is the minimum percent oxygen required to cause the foam to ignite. Thus, foams with a high LOI have a high resistance to burning.

Test samples were prepared by reacting an aromatic polyisocyanate (namely polymethylene polyphenylisocyanate, hereafter referred to as PAPI) with an aromatic polycarboxylic compound (namely benzophenone-3,3',4,4'-tetracarboxylic acid dianhydride, hereafter referred to as BTDA) in the presence of furfuryl alcohol and a strong inorganic acid (namely concentrated phosphoric acid, hereafter referred to as PA). Except for one notable exception, these materials produced foams that were excessively friable and/or that did not have as high a LOI as desired. Table I shows the results of these tests.

TABLE I

| SAMPLE NO. | COMPOSITION, % BY WEIGHT | | | | | RATIO OF $\frac{PA}{PAPI}$ (%) | FRIABILITY % | LOI (% O$_2$) |
|---|---|---|---|---|---|---|---|---|
| | PAPI | BTDA | FA | PA | STANNOUS OCTOATE | | | |
| 7 | 41.5 | 20.4 | 31.7 | 6.34 | 0 | 15.3 | 30.2 | 24.5 |
| 14 | 41.3 | 20.3 | 31.6 | 6.31 | 0.5 | 15.3 | 8.7 | 29.0 |
| 15 | 41.0 | 20.2 | 31.4 | 6.28 | 1.0 | 15.3 | 11.2 | 30.5 |
| 16 | 40.3 | 19.8 | 30.8 | 6.16 | 2.9 | 15.3 | 16.1 | 27.5 |
| 21 | 37.7 | 18.5 | 28.8 | 14.52 | 0.5 | 38.5 | 7.6 | 26.0 |
| 22 | 37.5 | 18.4 | 28.6 | 14.45 | 1.0 | 38.5 | 7.6 | 27.0 |
| 23 | 39.9 | 19.6 | 30.4 | 9.11 | 1.0 | 22.8 | 7.8 | 31.5 |
| 24 | 40.3 | 19.8 | 30.7 | 9.20 | 0 | 22.8 | 4.0 | 34.5 |

Since BTDA is a less reactive dianhydride, stannous octoate was added to the reactants in amounts of 0.5, 1.0, and 2.9 to serve as a catalyst. As shown by samples 14, 15, and 16 in Table I, the friability was reduced by the addition of stannous octoate and the LOI was increased, both promising developments.

Since the addition of stannous octoate improved the friability and LOI of the foam, tests were run on compositions having 0.5 and 1.0% stannous octoate, but the ratio of PA to PAPI, PA/PAPI, was increased from 15.3% to 38.5% (samples 21 and 22). Both these samples had a relatively low friability, 7.6%, but the LOI was disappointingly low.

A composition having a PA/PAPI ratio of 22.8% (sample 23) had relatively low friability, 7.8%, and a high LOI. When the stannous octoate was dropped from this composition (sample 24), a combination of very low friability, 4.0%, with a very high LOI, 34.5%, was obtained. This was an unexpected result, particularly in view of the beneficial result which stannous octoate had when the ratio of PA/PAPI was 15.3% (samples 7–16). The resulting foam is a very useful product in application requiring heat resistance because of its high LOI and good resistance against crumbling.

Figure 2:
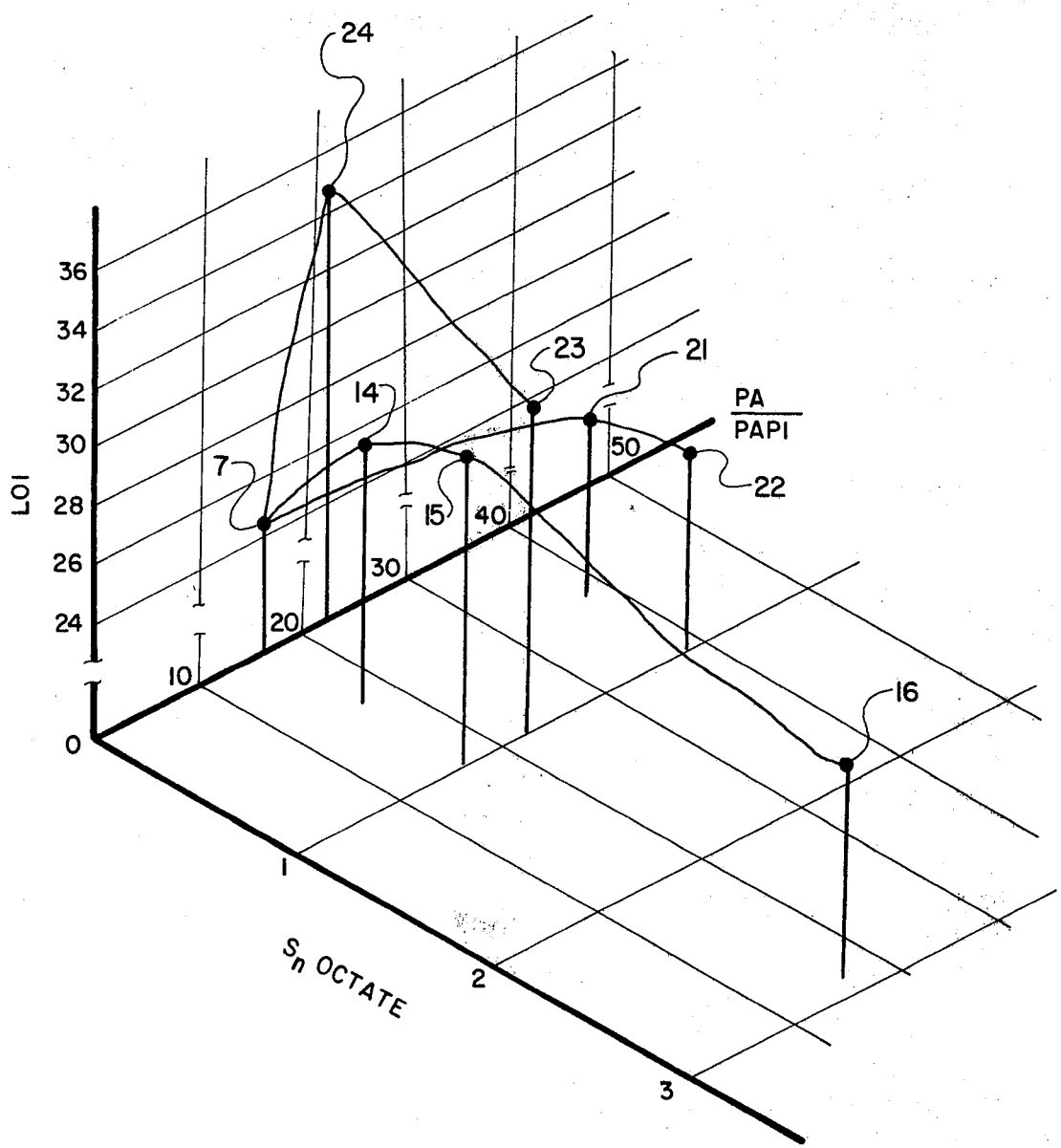
FIG. 2 is a three-dimensional graph showing the effect of the amount of stannous octoate and the effect of the ratio of phosphoric acid to polyphenylisocyanate (PA/PAPI) on the limiting oxygen index (LOI) of the polyimide foam.

FIGS. 1 and 2 show these results plotted on three dimensional graphs. Reference numbers refer to the sample numbers given in Table I. In FIG. 1, the vertical axis is the percent weight loss resulting from the friability test. Sample number 24 is the preferred composition of the invention. It has the lowest (and hence best) friability despite the fact that it has a PA/PAPI ratio only 7.5% greater than sample number 7 which had the highest (and hence worst) friability rating.

In FIG. 2, the vertical axis is the limiting oxygen index (LOI). Sample 24 has the highest (and hence best) LOI despite the fact that it is closest in composition to example 7 which had the lowest (and hence worst) LOI.

Thus, the preferred embodiment of the invention is exemplified by sample number 24 in Table I and in FIGS. 1 and 2. It is a foam produced by reacting PAPI, BTDA, furfuryl alcohol, and phosphoric acid using procedures well known in the art. However, the ratio of phosphoric acid (PA) to polyphenylisocyanate (PAPI) must be within the approximate range of 20 to 26% by weight. Stannous octoate should not be added to the reactants.

Numerous variations and modifications can be made without departing from the invention. For example, minor amounts of ingredients such as 2–3% silicone surfactants can be added to the composition for the known effects they produce. Accordingly, it should be clearly understood that the form of the invention described above and shown in the accompanying drawings is illustrative only and is not intended to limit the scope of the invention.

What is claimed is:

1. An improvement in a process for preparing a fire-resistant foam by the reaction of an aromatic polyisocyanate and an aromatic polycarboxylic compound in the presence of furfuryl alcohol and a strong inorganic acid, said improvement comprising:
    selecting polymethylene polyphenylisocyanate (PAPI) from said aromatic polyisocyanates;
    selecting benzophenone-3,3',4,4'-tetracarboxylic acid dianhydride (BTDA) from said aromatic polycarboxylic compounds;
    selecting phosphoric acid (PA) from said strong inorganic acids; and
    carrying out said reaction using a ratio of said phosphoric acid to said polymethylene polyphenylisocyanate (PA/PAPI) of approximately 20 to 26% by weight.

2. The improvement as claimed in claim 1, wherein said step of carrying out said reaction is accomplished using the following percent by weight of ingredients:
    PAPI 37 to 42%;
    BTDA 18 to 21%,
    furfuryl alcohol 28 to 32%; and
    phosphoric acid 8 to 10%.

3. A temperature resistant foam produced by:
    reacting polymethylene polyphenylisocyanate (PAPI) with benzophenone-3,3',4,4'-tetracarboxylic acid dianhydride (BTDA) in the presence of furfuryl alcohol and phosphoric acid (PA), wherein the ratio of said phosphric acid to said polymethylene polyphenylisocyanate, (PA/PAPI), is approximately 20 to 26% by weight.

4. The temperature resistance foam as claimed in claim 3, wherein the percent by weight of the reactants is:
    PAPI 37 to 42%;
    BTDA 18 to 21%;
    furfuryl alcohol 28 to 32%; and
    phosphoric acid 8 to 10%.

* * * * *